United States Patent [19]
Grosjean

[11] Patent Number: 4,648,268
[45] Date of Patent: Mar. 10, 1987

[54] METHOD OF DEFINING HOMOGENEOUS ROCK FORMATION ZONES ALONG A BOREHOLE ON THE BASIS OF LOGS

[75] Inventor: Yves H. Grosjean, Paris, France

[73] Assignee: TOTAL Compagnie Francaise des Petroles, Paris, France

[21] Appl. No.: 779,404

[22] Filed: Sep. 24, 1985

[30] Foreign Application Priority Data

Oct. 22, 1984 [FR] France ................................ 84 16116

[51] Int. Cl.$^4$ ............................................ E21B 49/00
[52] U.S. Cl. ........................................ 73/152; 364/422
[58] Field of Search ................. 73/152; 364/422; 324/323, 339; 340/853; 367/25, 86, 33

[56] References Cited

U.S. PATENT DOCUMENTS 4,440,020  4/1984  Boutemy et al. ...................... 73/152
4,484,278  11/1984  Edmundson ......................... 364/422

OTHER PUBLICATIONS

Kerzner et al., Blocking-A New Technique for Well-Log Interpretation, Journal of Petroleum Technology, Feb. 1984, pp. 267–275.

*Primary Examiner*—Michael J. Tokar
*Assistant Examiner*—Scott M. Oldhan
*Attorney, Agent, or Firm*—Sughrue, Mion, Zinn, Macpeak & Seas

[57] ABSTRACT

A method of defining homogeneous rock formation zones along a borehole on the basis of logs, uses two logs, a lithological log and a log relating to the impregnation fluids. Individual limits of zones are determined by reproducing or reshaping each of the logs in the form of rectangular zones or crenellations, preferably rough crenellations for the first log and smoothed crenellations for the second log, and the individual limits are combined to obtain synthetic limits, some of the individual limits belonging to the first log only preferably being subsequently eliminated when the first log is smoothed.

1 Claim, 6 Drawing Figures

METHOD OF DEFINING HOMOGENEOUS ROCK FORMATION ZONES ALONG A BOREHOLE ON THE BASIS OF LOGS

BACKGROUND OF THE INVENTION

The invention relates to the study of the rock formations, through which a borehole passes, by means of recordings as a function of depth, called logs, of certain characteristics measured by probes moved along the borehole.

It is easier to interpret the logs if there is a preliminary operation which involves defining, on the basis of these logs, successive homogeneous rock formation zones along the borehole.

There have already been proposals for various techniques for identifying transitions in a diagraphic recording and for producing the recording in the form of rectangles or crenellations assumed to correspond to strata of geological formations.

More recently, there has been a proposal not to carry out the operation of defining homogeneous zones on the basis of a single log, but to use several logs during this operation. For this purpose, the extent of each homogeneous zone in terms of depth is ascertained by determining, for a series of sampling levels, whether the values of each of the characteristics measured by the various logs used for the definition operation are indeed uniform, that is to say do not differ from one another by an amount greater than a predetermined maximum. This operation thus entails laborious data-processing work.

SUMMARY OF THE INVENTION

According to the invention there is provided a method of defining homogeneous rock formation zones along a borehole on the basis of two logs, the first log giving lithological information and the second log giving information relating to the fluids impregnating the rock formations, wherein the individual limits of homogeneous rock formation zones are determined according to each of the two logs by reproducing the logs in the form of rectangular zones forming crenellations, and the individual limits are combined to obtain synthetic limits of homogeneous rock formation zones.

Preferably the individual limits are determined on the first log reproduced in the form of rough crenellations and on the second log reproduced in the form of smoothed crenellations, and two classes of synthetic limits are adopted comprising a first class comprising the individual limits of the first log which are common or substantially common to the two logs and the individual limits belonging to the second log only, and a second class, adopted temporarily, comprising the individual limits belonging to the first log only, some of which will finally be eliminated when the first log is smoothed.

BRIEF DESCRIPTION OF THE DRAWINGS

An embodiment of a method according to the invention will now be described, by way of example only, with reference to the accompanying drawings.

In the drawings.

DETAILED DESCRIPTION OF THE PREFERRED EMBODIMENT

Figure 1:
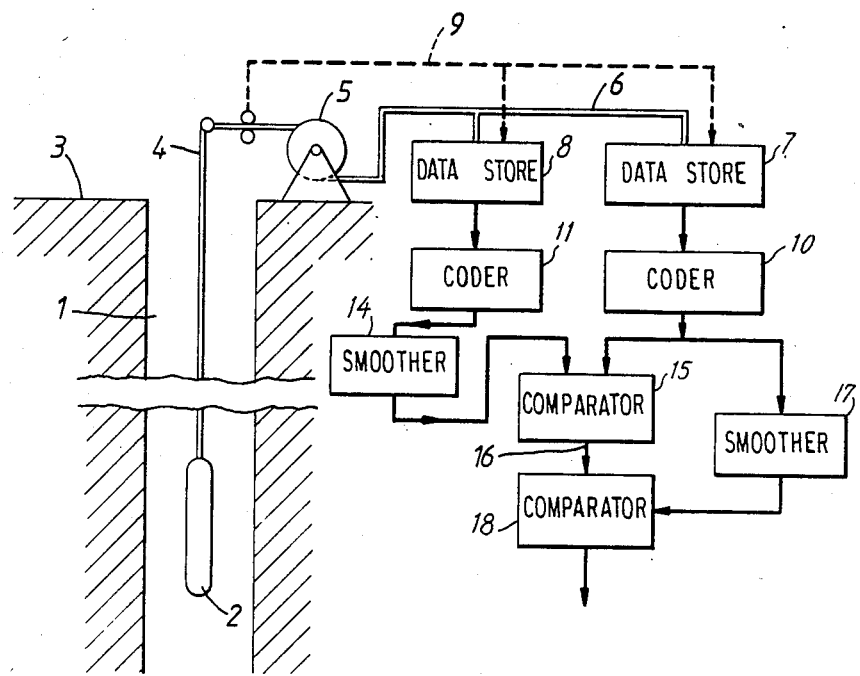
FIG. 1 is a block diagram of the operations carried out in the embodiment according to the invention.

FIG. 1 shows diagrammatically a borehole 1, in which a probe 2 connected to the surface 3 by means of an electrical carrying cable 4 wound on a winch 5 is moved from the bottom upwards. The information given by the probe 2 and conveyed to the surface 3 via the cable 4 is transmitted by the conductors 6 to storage devices 7 and 8 relating respectively to a first log made by means of a first probe 2 giving lithological information, for example porosity information, and to a second log made by means of a second probe 2 giving information on the fluids impregnating the formations, for example measuring resistivity. These storage devices also receive via connection 9 information relating to the depth at which each measurement is made.

Once this phase of measurement has been completed, the logs obtained are digitised, and this can be carried out, for example, on the basis of initial data in the form of curves traced on paper, by means of a specialised rule provided with a slider which is moved along the curves. This makes decentralised use possible. Each curve is sampled independently at points spaced irregularly from one another. The choice of these points by the user in itself constitutes filtering, since the user can thus eliminate some of the measuring noise.

If suitable equipment is available, a direct input of data read off on tapes at identical and constant depth intervals is also possible. In this case, the disadvantages of digitisation at non-constant sampling intervals are eliminated, but the advantages of the filtering mentioned above are lost.

FIG. 1 shows as a whole the recording of information and the processing of the latter at one and the same location, since this makes it possible to see as a whole how the proposed method is used. It will be clear however that various operations can be distributed at several locations, because the method can be put into practice irrespective of geographical distribution. The processing means are divided into separate elements to make the description clearer, and data-processing routines are used to carry out all the operations.

Figure 2:
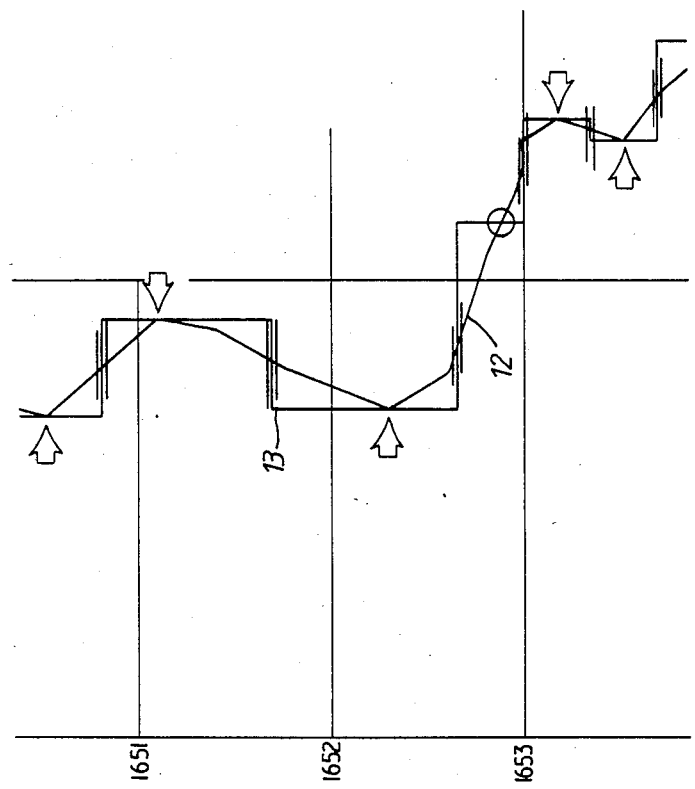
FIG. 2 shows a diagraphic plot in the form of rough crenellations.

The data stored in devices 7 and 8 are processed in coders 10 and 11 respectively, and in these coders the curves are reproduced or reshaped in the form of rectangular zones which form rough crenellations. FIG. 2 shows a curve which on the abcissa represents the measured quantity as a function of the depth plotted on the ordinate, and which has been reproduced or reshaped in the form of crenellations 13. Calculation of the first and second discrete derivatives of each curve makes it possible to identify the local extreme points, marked by an arrow in FIG. 2, and points of inflection with a negative third derivative which correspond to plateaus on the crenellated trace 13, such as that marked by a circle in FIG. 2. The individual limits between zones, the position of which is calculated, have been marked on the crenellated trace 13 by two parallel lines.

The significant points defining the rough crenellations of the trace 13 are smoothed in a smoothing device 14 for the crenellated trace obtained in the coder 11. The purpose of this smoothing is to eliminate the limits separating zones having quantities differing only slightly from one another. These zones are identified by means of a "moving-window" method which consists of a program simulating the movement along the rough crenellations of a bracket, the half-width of which is equal to the minimum deviation considered to be worth noting. Each time a limit is eliminated, the bracket is recentered on the integral mean of the rough crenellations which have been grouped together.

Figure 3:
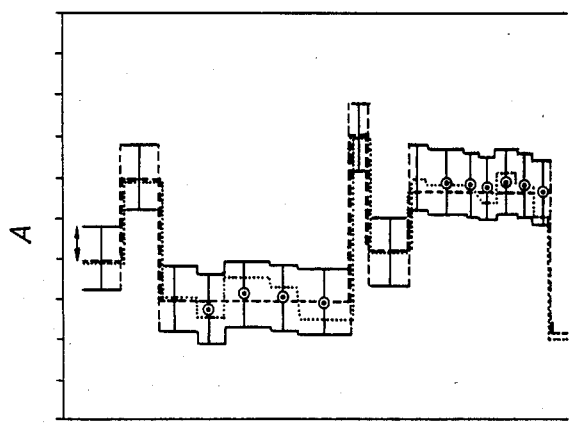
FIG. 3 shows a diagraphic plot in the form of smoothed crenellations.

FIG. 3 shows the rough crenellations by dotted lines and the smoothed crenellations by broken lines following the movement of the computation window, of which the successive positions which it assumes as a result of vertical movement are marked.

A comparator 15 receives both the rough crenellations coming from the coder 10 and the smoothed crenellations coming from the smoothing device 14. It supplies at its output 16 two classes of synthetic limits of homogeneous zones. The first class comprises the limits which have been adopted on the trace with smoothed crenellations, coming from device 14, and which are also found on the trace with rough crenellations, coming from device 10, with the exception of a depth setting tolerance (the position of these limits is taken from the trace with rough crenellations), and the limits belonging only to the trace with smoothed crenellations. The second class comprises the limits belonging only to the trace with rough crenellations. The procedure used prevents homogeneous zones of a thickness less than a predetermined minimum value from being produced.

The limits of the first class indicate changes in formation fluids, whether governed by lithology or not, whilst the limits of the second class reflect changes in lithology which only slightly affect the distribution of the formation fluids. These limits of the second class can very easily result from minor lithological variations, since the first log is not reproduced in the form of smoothed crenellations.

Smoothing of the lithological log is carried out in a smoothing device 17 similar to the device 14. A comparator 18, receiving information both from the output 16 and from the device 17, eliminates the limits of the second class which are no longer in the trace in the form of smoothed crenellations from the device 17 (and eliminates these limits only).

If homogeneous zones of a thickness less than the selected minimum value still remain, they are grouped together with that which is most closely similar to them. However, in cases which may be considered anomalous, in which narrow peaks with deflection jumps greater than a certain threshold are observed, the zone which thus occurs is retained.

The values of the reference lithological parameters are calculated at the same time as the above-described operation of defining homogeneous zones is carried out. All that remains is to calculate the values of the other parameters measured by logging on each homogeneous zone. Reproduction of the trace obtained for each parameter in the form of rough crenellations or smooth crenellations, preferably rough crenellations, is used for this operation.

Figure 4:
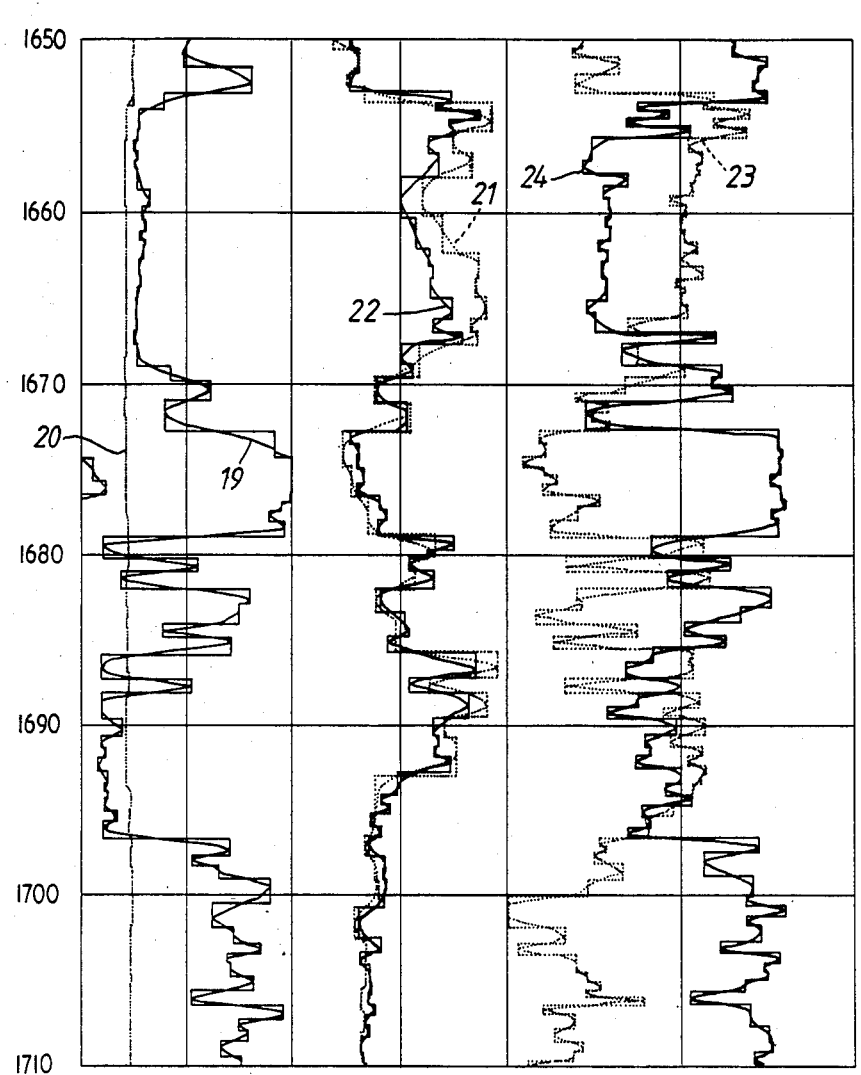
FIGS. 4 and 5 show several diagraphic plots respectively in the form of rough crenellations and smoothed crenellations.
Figure 5:
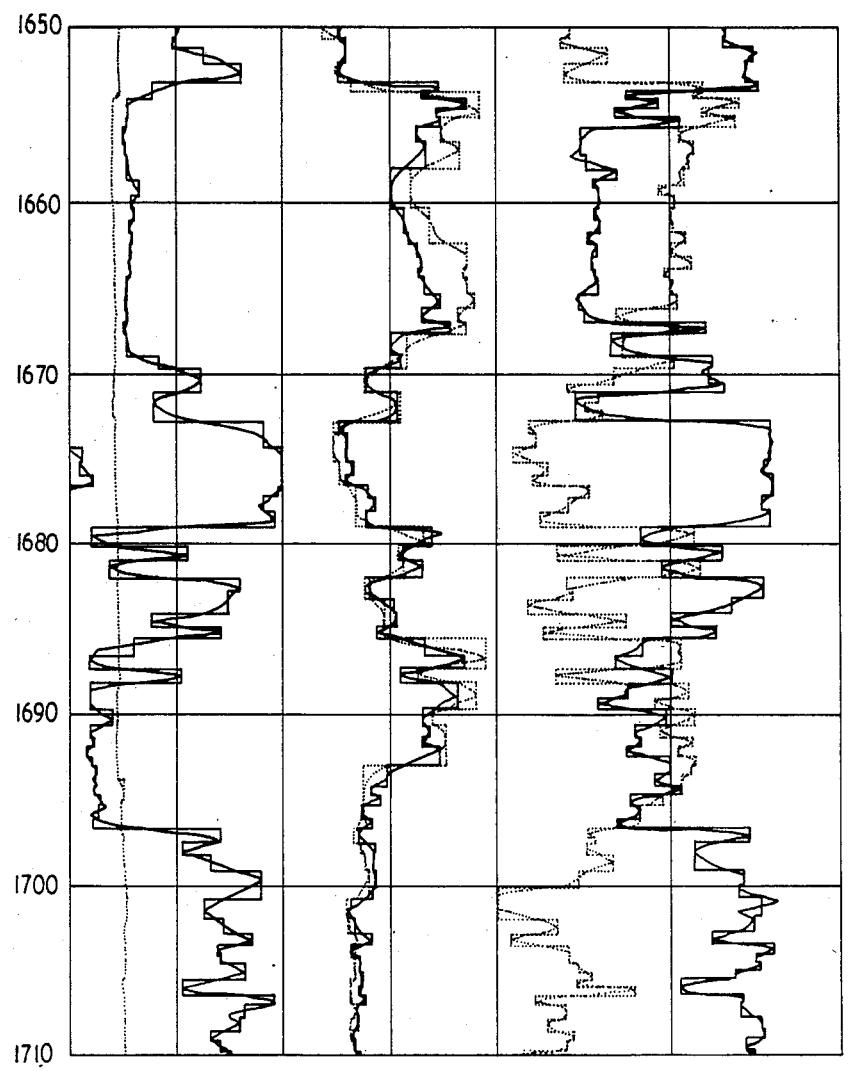

FIG. 4 shows three groups, each comprising two diagraphic measurements, after reproduction in the form of rough crenellations. In the group on the left, the trace 19 represents the natural radioactivity and the trace 20 represents a measurement of the borehole diameter. In the middle group, the two traces 21 and 22 represent resistivity measurements made at different depths of exploration. In the group on the right, the two traces 23 and 24 represent measurements of electronic density (unbroken lines) and porosity evaluated according to the hydrogen index (dotted lines). FIG. 5 shows the same three groups of diagraphic measurements after a calculation of the values of the parameters measured according to the rough crenellations of FIG. 4, on homogeneous zones identified by means of logs 23 (lithology) and 24 (fluids).

Figure 6:
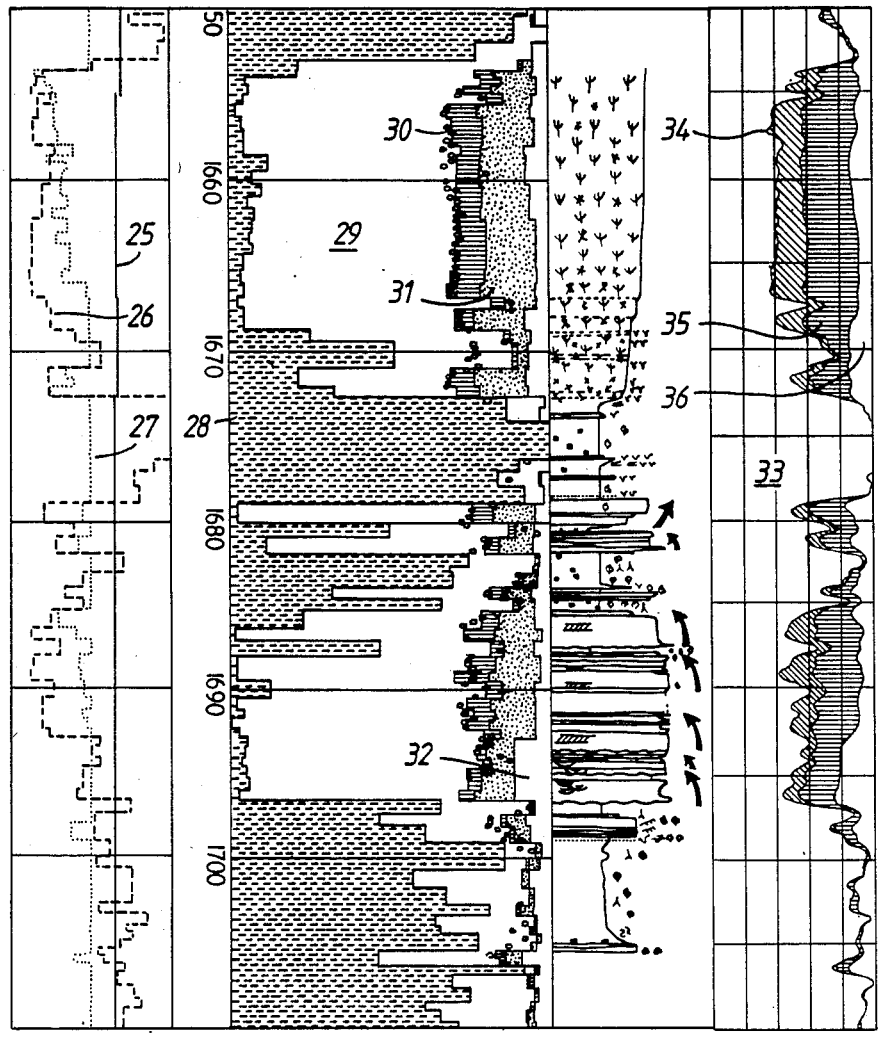
FIG. 6 shows in a comparative way representations of a geological formation obtained by means of a method according to the invention, from core samples and from diagraphic records not processed according to the present invention.

FIG. 6 makes it possible to compare the results obtained by an interpretation of diagraphic measurements in the form of homogeneous zones, as described above (the first and second columns from the left), with core measurements and their description (third column) and with a similar interpretation carried out on data sampled at constant depth intervals and read off recorded tapes (fourth column).

The first column represents the matrix density by an unbroken line 25, saturation with hydrocarbons by a broken line 26, and the density of the hydrocarbons by a dotted line 27. The second column represents, from left to right, the fraction of volume in the form of clay 28, the fraction in the form of unhydrous matrix (the space 29 left blank), the fraction of non-displaced hydrocarbons 30, the fractions of displaced hydrocarbons 31 and the water fraction (the space 32 left blank). The third column represents the results given by the core-sampling, and the fourth column represents the result of the same diagraphic calculation carried out on data recorded on magnetic tapes: from left to right there are the fractions of volume occupied respectively by the clays and the matrix (the space 33 left blank), by non-displaced hydrocarbons 34, by displaced hydrocarbons 35, and by water (the space 36 left blank).

The results obtained by means of the method according to the invention described above are very good. The positioning of the limits of homogeneous zones is often more accurate than that obtained manually, and the computation time is greatly reduced.

There is thus provided a method of defining zones which is simpler than those used heretofor, but which allows excellent interpretation of the diagraphic data.

What is claimed is:

1. A method defining final limits of homogeneous rock formation zones along a borehole on the basis of first and second logs by reproducing said logs in the form of rectangular zones forming crenellations, said first log being obtained in a first logging operation giving lithological information and the second log being obtained in a second logging operation giving information relative to the fluids impregnating the rock formation, comprising the steps of:

determining provisional first individual limits of homogeneous rock formation on said first log as obtained in the first logging operation before smoothing the crenellations of the same;

determining provisional second individual limits of homogeneous rock formation on said second log after smoothing the crenellations of the same;

defining as first final limits of homogeneous rock formation zones those ones of said first individual limits substantially equal to some of said second individual limits, and the second individual limits belonging to said second log only;

smoothing the crenellations of said first log; and defining as second final limits of homogeneous rock formation zones the limits of said first individual limits still appearing after smoothing the crenellations of the first log and not appearing on said first final limits.

* * * * *